US012631777B2

(12) United States Patent
Aghayan et al.

(10) Patent No.: US 12,631,777 B2
(45) Date of Patent: May 19, 2026

(54) SYSTEM AND METHOD FOR OBTAINING MINIMUM-PHASE SOURCE-SIGNATURES FROM MULTI-CHANNEL MULTI-OFFSET SEISMIC DATA

(71) Applicant: The Board of Regents for the Oklahoma Agricultural and Mechanical Colleges, Stillwater, OK (US)

(72) Inventors: Afshin Aghayan, Stillwater, OK (US); Priyank Jaiswal, Stillwater, OK (US)

(73) Assignee: The Board of Regents for the Oklahoma Agricultural and Mechanical Colleges, Stillwater, OK (US)

( * ) Notice: Subject to any disclaimer, the term of this patent is extended or adjusted under 35 U.S.C. 154(b) by 430 days.

(21) Appl. No.: 18/034,428

(22) PCT Filed: Nov. 5, 2021

(86) PCT No.: PCT/US2021/058233
§ 371 (c)(1),
(2) Date: Apr. 28, 2023

(87) PCT Pub. No.: WO2022/098991
PCT Pub. Date: May 12, 2022

(65) Prior Publication Data
US 2023/0393295 A1        Dec. 7, 2023

Related U.S. Application Data

(60) Provisional application No. 63/110,524, filed on Nov. 6, 2020.

(51) Int. Cl.
*G01V 1/30*        (2006.01)

(52) U.S. Cl.
CPC .......... *G01V 1/307* (2013.01); *G01V 2210/23* (2013.01); *G01V 2210/6161* (2013.01); *G01V 2210/63* (2013.01)

(58) Field of Classification Search
CPC ............... G01V 1/307; G01V 2210/63; G01V 2210/6161; G01V 2210/23; G01V 2210/30
See application file for complete search history.

(56) References Cited

U.S. PATENT DOCUMENTS 5,909,655 A * 6/1999 Canadas ................ G01V 1/362
                                                            702/17
8,103,453 B2 * 1/2012 Abma ...................... G01V 1/36
                                                            703/10

(Continued)

FOREIGN PATENT DOCUMENTS

GB            2317954 A * 4/1998 ............. G01V 1/362

*Primary Examiner* — Elias Desta
(74) *Attorney, Agent, or Firm* — Fellers, Snider, Blankenship, Bailey & Tippens, P.C.; Terry L. Watt

(57) ABSTRACT

According to one embodiment, a near-field data is used to determine a taper length that can isolate the source signature at the top of near-field data with minimum interaction with the Green's function. In some embodiments, a range of taper lengths is selected and for each length after tapering the near-filed data, converting each filtered near-field data to its minimum-phase equivalents. Summing pairwise cross-correlation of all of the minimum-phase equivalent wavelets at the zero-lag provides an attribute that shows how much the tapered portions of the near-field data look alike. An acceptable taper size will be the one that has the highest summation value. Finally, the average of the minimum-phase equivalents of tapered near-field data with the selected taper size is the estimated source signature.

16 Claims, 5 Drawing Sheets

(56) References Cited

U.S. PATENT DOCUMENTS

| | | | |
|---|---|---|---|
| 9,798,028 B2 * | 10/2017 | Etgen ..................... | G01V 1/301 |
| 2004/0020642 A1 | 2/2004 | Vinegar et al. | |
| 2005/0207278 A1 | 9/2005 | Reshef et al. | |
| 2012/0026883 A1 | 2/2012 | Chu et al. | |
| 2016/0047928 A1 | 2/2016 | Hegna et al. | |
| 2016/0187513 A1 | 6/2016 | Poole et al. | |

* cited by examiner

*Fig. 3*

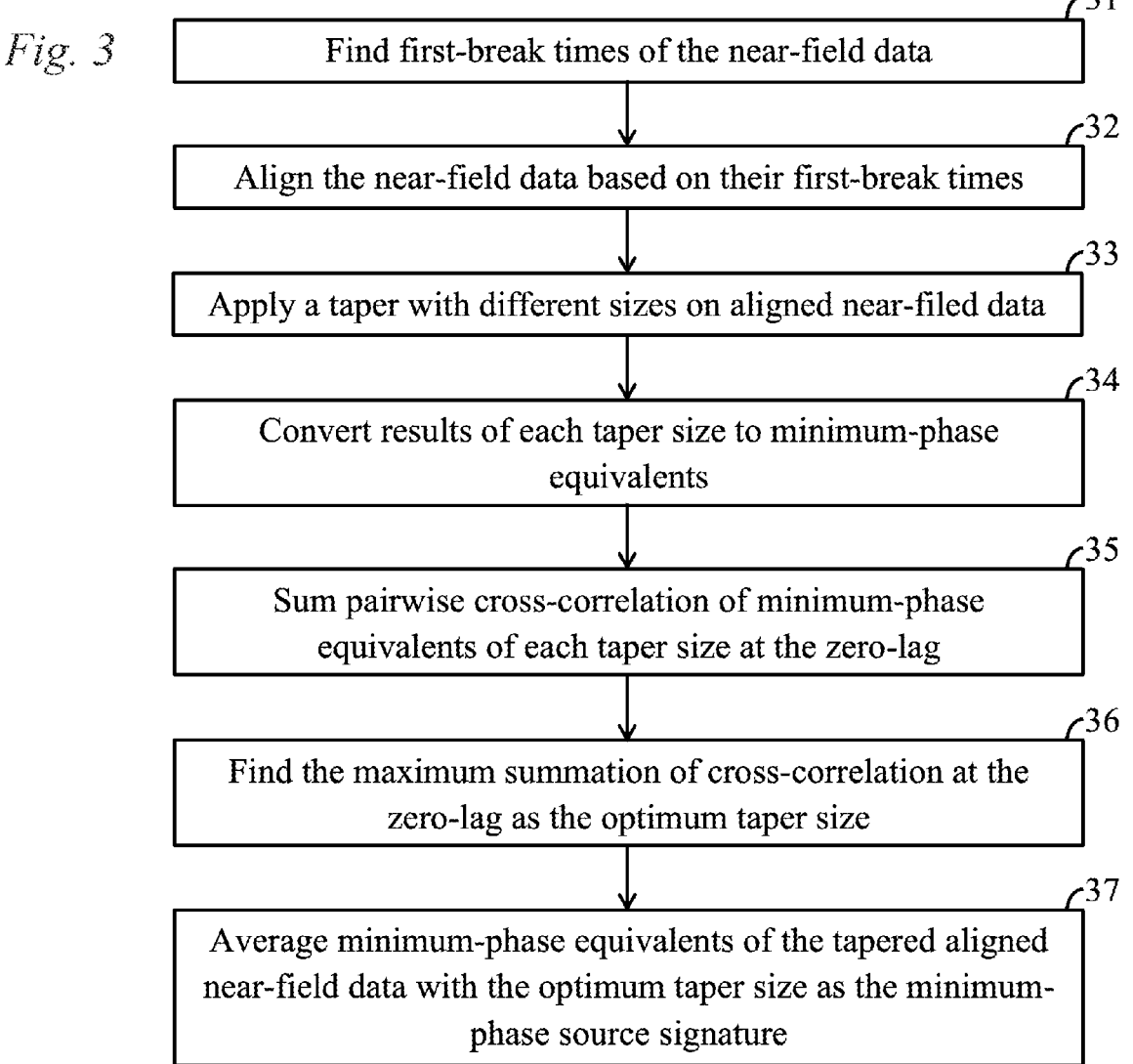

31
Find first-break times of the near-field data

32
Align the near-field data based on their first-break times

33
Apply a taper with different sizes on aligned near-filed data

34
Convert results of each taper size to minimum-phase equivalents

35
Sum pairwise cross-correlation of minimum-phase equivalents of each taper size at the zero-lag 36
Find the maximum summation of cross-correlation at the zero-lag as the optimum taper size 37
Average minimum-phase equivalents of the tapered aligned near-field data with the optimum taper size as the minimum-phase source signature Measured Source Signature by reference seismic recorder

SYSTEM AND METHOD FOR OBTAINING MINIMUM-PHASE SOURCE-SIGNATURES FROM MULTI-CHANNEL MULTI-OFFSET SEISMIC DATA

CROSS REFERENCE TO RELATED APPLICATIONS

This application claims the benefit of U.S. Provisional Patent Application Ser. No. 63/110,524 filed on Nov. 6, 2020, and incorporates said provisional application by reference into this document as if fully set out at this point.

TECHNICAL FIELD

The instant invention relates generally to exploration for subsurface resources such as oil and gas, and, more particularly, to systems and methods for processing seismic data.

BACKGROUND

A seismic survey is designed to image or map the subsurface of the earth by sending energy generated by a seismic source down into the ground and recording the "echoes" that return from the rock layers below. The source of seismic energy might be, for example, explosions or seismic vibrators on land, or air guns in marine environments. During a seismic survey, the source is positioned at various locations near the surface of the earth above a geologic structure of interest. Each time the source is activated, it generates a signal that travels downward through the earth, is partially reflected, and, upon its return, is recorded at a great many locations on the surface. The returning seismic energy might be recorded by geophones on land or by hydrophones in a marine environment. The signal that is produced by a source activation is typically referred to as the signature of that source.

The trajectory of the signal from the source to the receiver through the subsurface may be represented by a subsurface ray path. That is, the signal adopts various "ray paths" some of which correspond to a reflection where the signal clearly bounces off a subsurface formation (yielding a "reflector" on the seismic section) while others travel a path that is reminiscent of an arc. The later type of ray is known as a turning ray. The turning rays exist in the part of the subsurface shallower than the first reflector.

A seismic trace is a digital recording of the energy resulting from the activation of a seismic source and includes direct arrivals that travel to the recorder from the source along the surface and reflections from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a discrete sampling of the reflected wavefield in time. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (e.g., as part of the trace header information). This allows the seismic information contained within the traces to be later correlated with specific surface and subsurface locations, thereby providing a means for posting and contouring seismic data—and attributes extracted therefrom—on a map (i.e., "mapping").

Multiple source/recording combinations can be combined to create a near continuous profile of the subsurface that can extend for many miles. In a two-dimensional (2-D) seismic survey, the recording locations are generally laid out along a single line, whereas in a three-dimensional (3-D) survey the recording locations are distributed across the surface in a grid pattern. A 2-D survey may be thought of as providing a 2-D cross sectional image of the inhomogeneities in the subsurface, whereas a 3-D survey yields data that represents a 3D volumetric view of the subsurface.

An active source survey (as opposed to a passive source survey) obtains seismic traces that represent recordings of the seismic wavefield at progressively increasing distances from the sources' locations. The recordings may be conceptualized as the convolution of the source's signature with an unknown Green's function that incorporates the physical properties of the subsurface rocks and fluids through which the wavefield passes. In addition, the recorded seismic data invariably includes some amount of random noise. Thus, each seismic trace may be viewed as the signature of the source that created that trace convolved with a Green's function plus noise.

Source signature estimation, as a crucial step in seismic data analysis, improves the resolution and accuracy of subsurface seismic imaging; however, its effectiveness directly relates to the quality of the recorded or estimated source signature. If the seismic source could be accurately recorded as it is made that would be useful in obtaining an estimate of the subsurface Green's function. However, acquisition challenges mean that recording source signatures in field conditions, and especially for land data, might not be straightforward (Ziolkowski, 2017, 1993, 1991; Ziolkowski and Bokhorst, 1993). Estimation of the source signature is extremely challenging due to its inherent non-stationarity, varying distances between the source and sensors (e.g., hydrophone or geophone), and the existence of the different types of noises (e.g., random, coherent, and cultural). Noise is especially an issue in land-data that are acquired with a hammer or implosive sources.

Therefore, most statistical methods of source estimation principally target marine data or land data acquired with vibro seismic sources (Christie and Lunnon, 2009; Guillouet, et al., 2017; Hargreaves, 1987; Ni, 2019; Norris and Reilly, 2017), where, in both cases, it is possible to obtain relatively reliable measurements of the source signature each time the source is activated. Land seismic data acquired using hammer or implosive sources are typically challenging to process using conventional approaches, although a source signature can also be estimated through inversion methods (Gholami, 2015; Haghshenas Lari and Gholami, 2019; Kazemi, 2018; Kazemi and Sacchi, 2013). However, the aforementioned methods' accuracy depends on the availability of a good initial estimation of the source signature, and the noise content of the data and will seemingly create a circular problem.

Thus, what is needed is a method that can be used to estimate both marine and land data seismic source signatures regardless of the nature of the source.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to an embodiment, a method is presented herein that provides an estimate of the signature of a seismic source directly from near-field data. This method can be used for both marine and land data. It is designed to reconstruct a minimum-phase source signature with minimal error estimation. One embodiment begins by selecting a range of taper sizes. Then, for each taper length, applying the taper to the selected near field data traces after accounting for offset, converting each tapered trace to its minimum phase equivalent wavelet, calculating all possible pair-wise cross correlations between the resulting minimum phase wavelets, and summing together all of the pair-wise cross correlations at zero lag. The preferred taper size will be chosen to be the one that has the highest summation value.

Finally, and continuing with the present example, the average of the minimum-phase equivalents of the tapered near-field data with the selected size taper represents the estimated source signature. Because the reconstructed source signature is always minimum phase, it can be used directly for the source signature deconvolution without any hesitation regarding the inverse filter calculation.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 3 is a flowchart showing basic steps in one embodiment of the present inventive method;

Figures 1A, 1B:
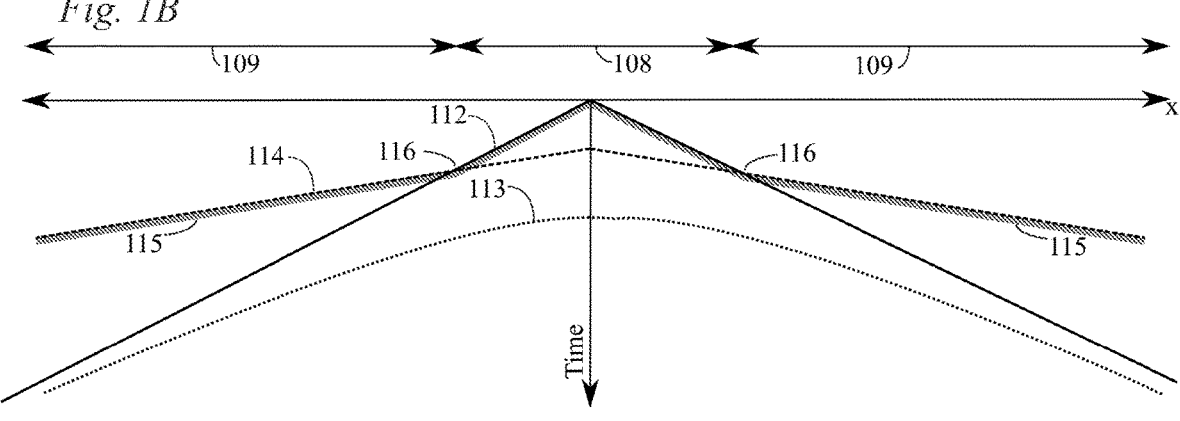
FIG. 1A is a diagram that illustrates various ray paths in a typical land seismic data acquisition program according to an embodiment and FIG. 1B contains diagram that illustrates traveltime curves for a variety of different ray paths.

The invention will be described in connection with its preferred embodiments. However, to the extent that the following detailed description is specific to a particular embodiment or a particular use of the invention, this is intended to be illustrative only and is not construed as limiting the invention's scope. On the contrary, it is intended to cover all alternatives, modifications, and equivalents included within the invention's spirit and scope, as defined by the appended claims.

DETAILED DESCRIPTION

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

According to an embodiment near-field seismic data are especially useful in estimating a minimum-phase source signature. Near-field data is collected by the seismic recorders that are situated closest to the source and the first recorded waveforms on these traces will be direct waves. The remaining seismic recorders would be expected to collect far-field data. FIG. 1A illustrates this concept.

FIG. 1A shows a typical split-spread 2D land seismic survey shot/receiver configuration that may be used to collect seismic data. In this figure, the location of an active seismic source 101 is indicated, together with a number of seismic recorders 102, each of which may be an individual receiver (e.g., a geophone or hydrophone) or an array of same. The active source 101 could be, for example, a drop weight, hammer, or an impulsive source like dynamite in the land seismic survey or an array of air guns in marine data acquisitions.

As is conventionally done, the seismic wavefield generated by an activation of the source 101 is recorded by receivers 102 that are positioned at increasing distance from the source location. The recorded wavefield, which is created by the interaction of a source-emitted wavelet (also called source signature, SS) with the subsurface structure and stratigraphy 107, can be analyzed to extract the physical properties of the rocks and fluids that the wavelet passed through in the subsurface. Knowledge of physical properties such the subsurface velocities of the rock units, e.g., $V_1$ 110 and $V_2$ 111 in FIG. 1A, are especially useful in seismic exploration.

The active source 101 could be a drop weight, hammer, or an impulsive source like dynamite in the case of a land seismic survey or an array of air guns in marine data acquisitions. The data recorded in the field (i.e., the field records or seismic traces) may contain the desired reflected waveforms 105 originating from the seismic source(s) together with overlapping random noise or other events such as direct waves 104 reflected waves 105, and refraction waves 106. The character and arrival time of these waveforms depends on the distance between the source and seismic recorders, with longer distances (offsets) being associated with later arrival times.

Figure 2:
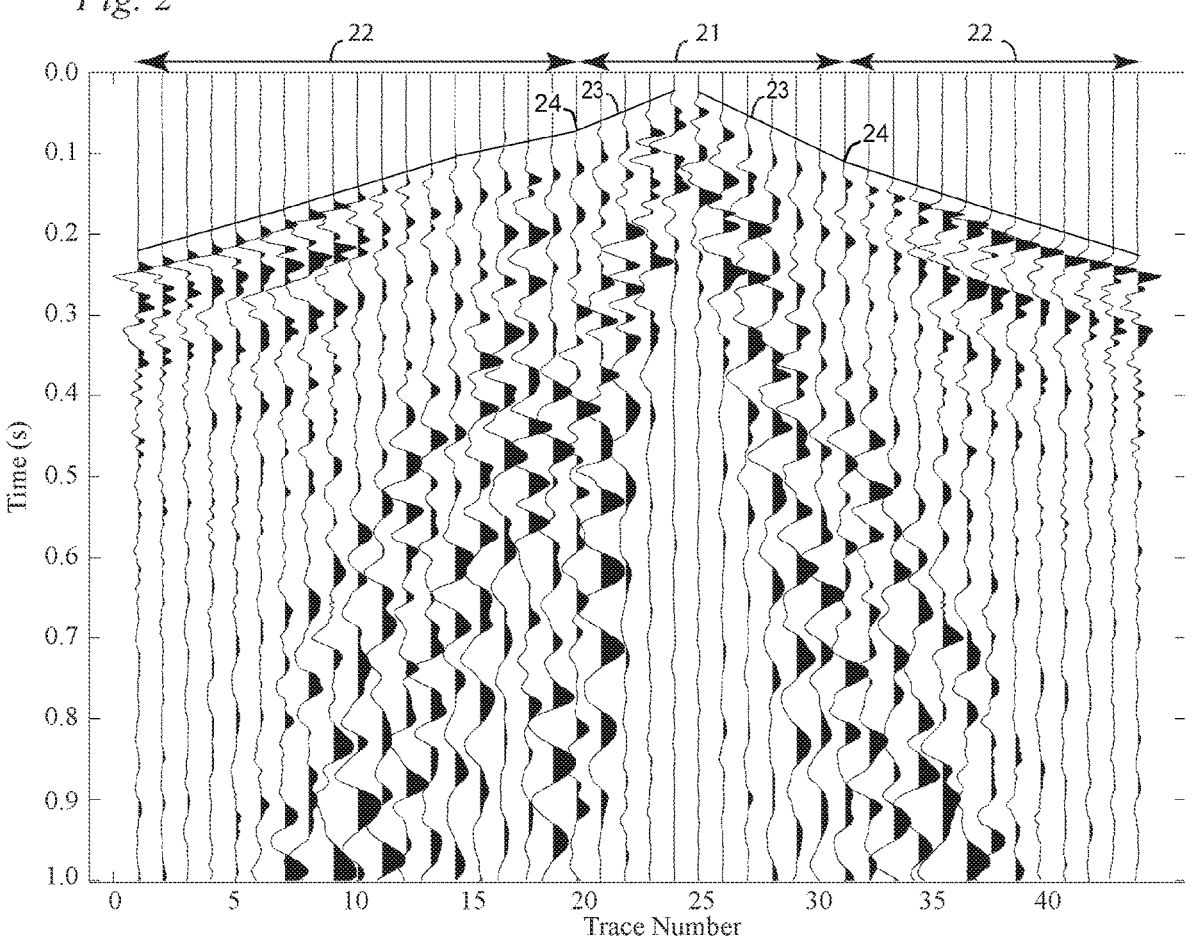
FIG. 2 shows a real seismic shot-gather including near and far-field data.
Figures 6A, 6B:
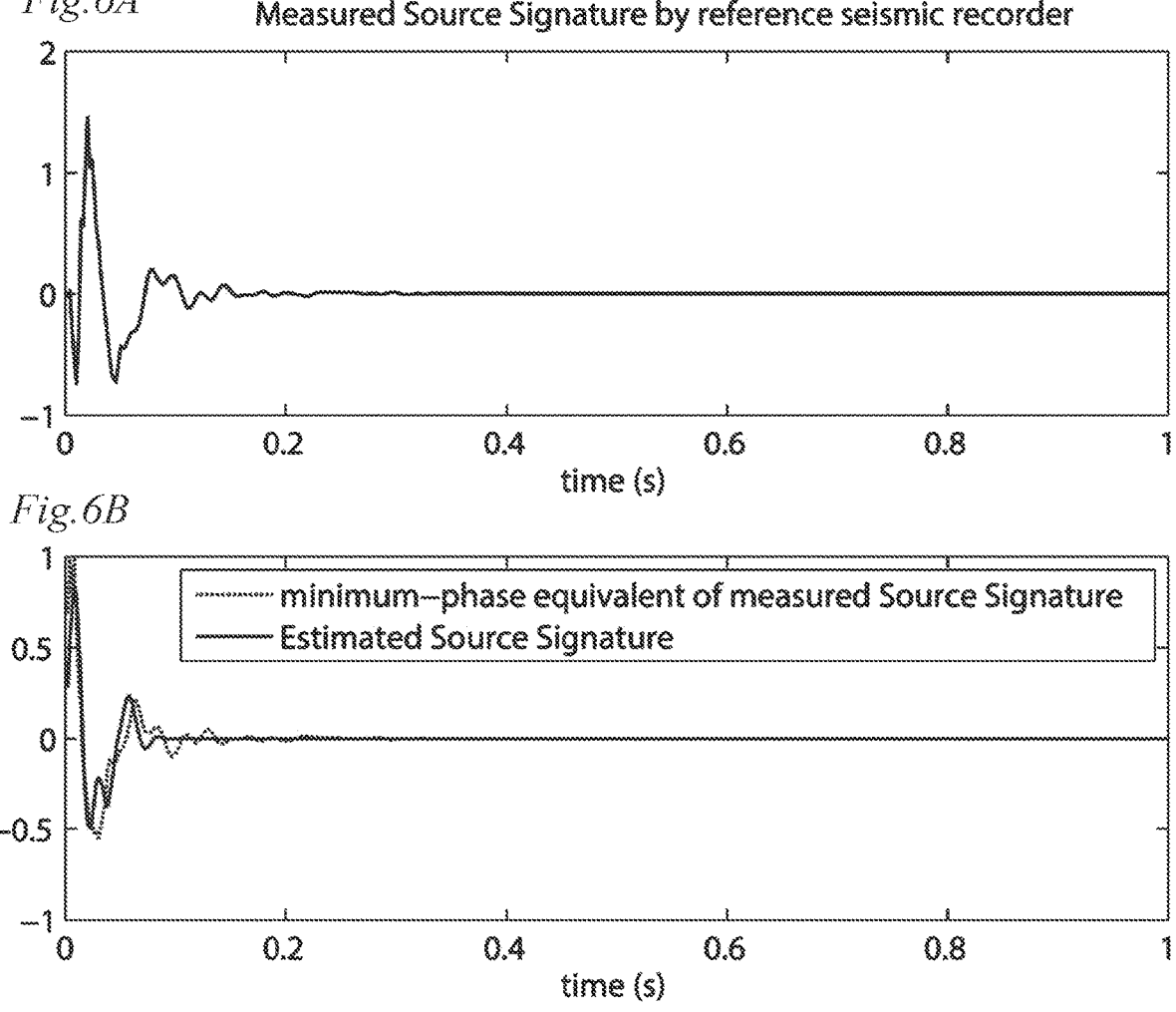
FIG. 6A shows the source signature as measured with a reference seismic recorder and FIG. 6B shows a comparison of the minimum-phase equivalent of measured and estimated source signature using the present inventive method.

As an example, FIG. 2 contains an actual data gather of land seismic data from the Western Desert, Egypt. The field acquisition geometry was two dimensional (2D, i.e., the receivers were situated along a straight line) and contained seismic recorders with a 10 Hz resonance frequency spaced 20 m apart. In the field, the source signature (SS; FIG. 6a) was recorded by placing a seismic recorder ~3 m from the shot tangential to the profile as is schematically illustrated in the arrow 103 in FIG. 1. Exemplary near and far-field data are identified in FIG. 2 with numbers 21 and 22, respectively.

Note that the example field record contains overlapping random noise and waveforms originating from seismic sources such as direct waves 104, reflection waves 105, and refraction waves 106. These waveforms arrive at times that depend on the distance between the source, and seismic recorders' locations and the velocity of the media through which they travel. Thus, these events can arrive at different can be recorded at different times.

The earliest time of signal energy observed in the seismic record is the first arrival time or first break 115 (FIG. 1B). The time at which the source was activated is recorded as a signal called a shot mark; this defines the time zero of recording. The first arrival time is measured from this shot mark, which is the first break seismic wave's propagation time (traveltime) from the shot point to seismic recorders.

FIG. 1B illustrates some typical traveltime curves for an embodiment. The curves in this example were prepared by plotting the distance between source and seismic recorders along the horizontal axis and the traveltimes on a vertical axis. The traveltime curve becomes a straight line 112 with a constant slope proportional to the reciprocal of the subsurface velocity $V_1$ 110 when the first arrival time is the direct wave 104 propagating along the surface from the shot point to seismic recorders. Further from the source, the seismic wave is refracted 106 at the boundary 107 between the first and second layers to the surface before the direct wave 104 as it 114 travels at the boundary at a faster velocity $V_2$ 111 than the first layer (FIG. 1A). The curve of the first arrival is a straight line with a gradient of the second layer velocity $V_2$ 111; thus, the traveltime curve presents two-line segments with a kink at point 116 called crossover distance ($x_c$).

For purposes of the instant example, near-field data 108 is a combination of seismic wavefields captured by seismic recorders where the first recorded waveform a direct wave. The data recorded by other seismic recorders will be considered to be far-field data 109. Therefore, all recorders with offsets smaller than crossover distance 116 are regarded as near-field traces.

In FIG. 2, the curve 23 shows first arrival times or first break, and kinks 24 in the travel time curve can be used as indicators of crossover distances which determines the near-field 21 and far-field 22 traces.

Note that in this particular example an assumption has been made that the second layer velocity is faster than the velocity of the first (surface) layer. The velocity of a geological formation is generally faster at a greater depth, especially for the first and second layers below the surface. If this assumption is not applicable in a particular situation, another an approach for determining the near-field traces may be employed. However, the accuracy of this approach tends to be less than when the crossover distance is used. In such case, for each taper size, 90% of the absolute cross-correlation value of the two nearest traces to the shot location at lag zero is considered as a threshold to define whether the next trace belongs to the near-field traces or not. Of course, the 90% value might be increased or decreased depending on the particular situation. As a general rule of thumb, kinks 24 on the traveltime curve are a more reliable indicator of the crossover offset which the travel times of the direct and refracted waves are the same.

According to still another approach, it is possible in some cases to calculate the crossover distance ($x_c$) given estimates of the first and second layer velocities, $V_1$ 110 and $V_2$ 112 and the thickness of the first layer (h). In this case, assuming a two horizontal layer model an estimate of the crossover distance may be calculated via by the following expression:

$$x_c = 2h\sqrt{\frac{V_2 + V_1}{V_2 - V_1}}$$

Turning now to an embodiment, as a first preferred step a seismic gather is selected and the first-breaks identified on traces that have been determined to record near-field data. As described above and continuing with the present example, the first-breaks will be used to identify the near-field. In FIG. 2, that distance was determined to be 100 m. The near-field traces will then be selected for subsequent processing as is described below.

Figure 4:
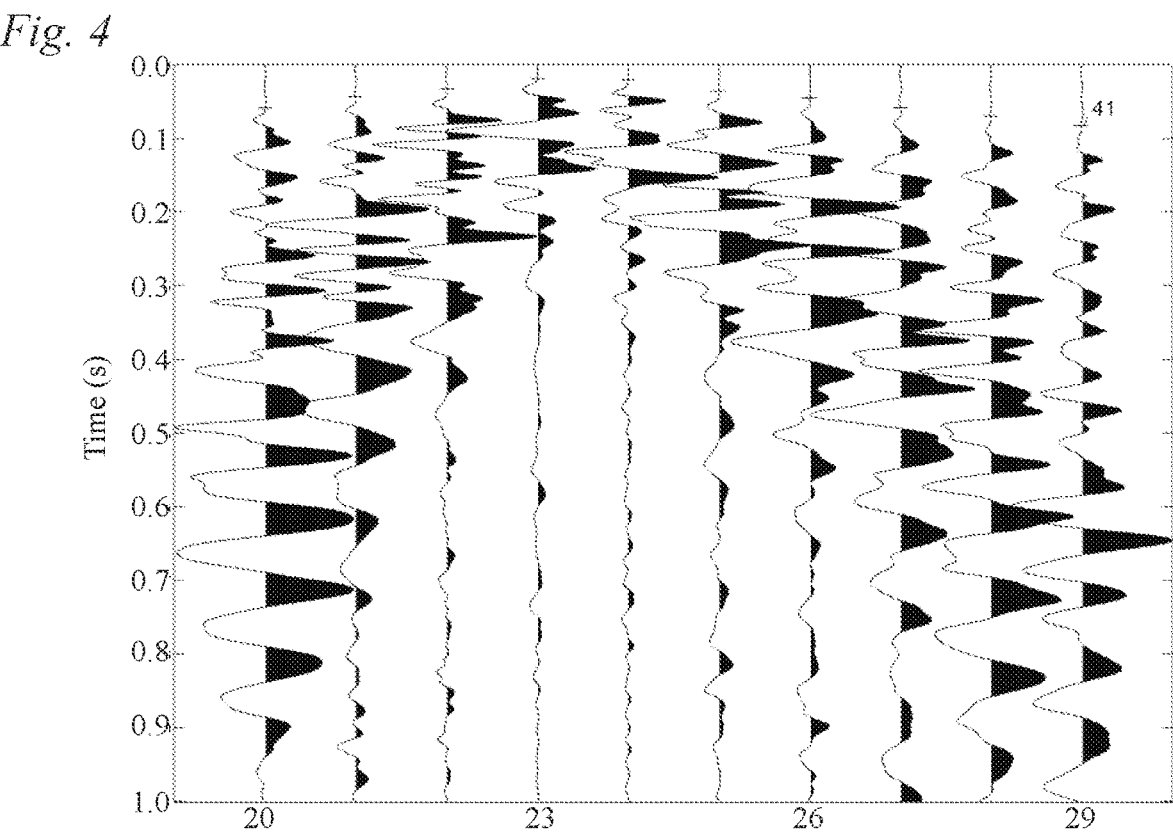
FIG. 4 shows only the near-field data in FIG. 2.
Figure 5:
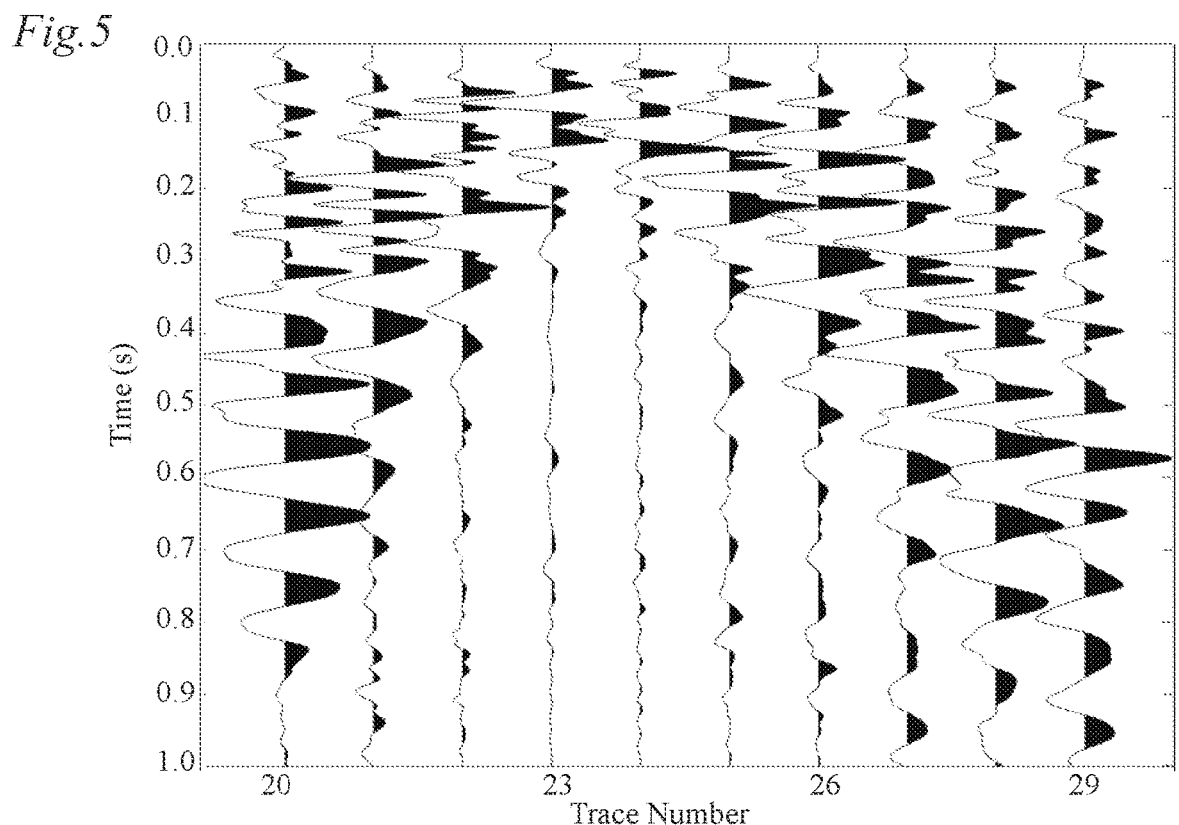
FIG. 5 shows aligned near-field data.

Continuing with the present example, given that the near-field traces in the gather have been identified, they are then aligned in time so that the onset of the first break on each trace occurs at zero time (or some other arbitrary time) on every trace (FIG. 5). It should be noted that in some embodiments, rather than actually shifting each trace in time, the time of the onset of the first-break on each seismic trace will be stored (e.g., in memory) for use in the steps that follows (see, e.g., FIG. 4). That being said, for purposes of the instant disclosure when it is said that the near-field seismic traces are "aligned in time" that phrase should be interpreted broadly to include instances where data in the seismic traces is moved up or down in time to create the alignment as well as other instances where the start time of the first break of each trace is used as a location by which the associated data can be accessed and/or manipulated in the original seismic trace.

As a next preferred step, after the near-field seismic data traces are aligned based on the first-break time of each trace, an acceptable or optimum taper size is determined that can be used to isolate the source signature at the top of near-field data. Preferably the choice will be made with the goal of creating a minimum interaction with the Green's function that represents the interaction of the source wavelet with the subsurface. For this purpose, one preferred approach is as follows:

Select a range of taper sizes;
For each taper length:
    apply the taper to the selected near field data traces accounting for offset (e.g., align the first break times by shifting the first break of each trace to zero);
    convert each tapered trace to its minimum phase equivalent wavelet;
    calculate all possible pair-wise cross correlations between the resulting minimum phase wavelets; and
    sum together all of the pair-wise cross correlation values at zero lag to produce a quality value associated with that taper length.

In the current example, the optimum taper size will have the highest summation/quality value. For purposes of illustration only, the tapers used in FIG. 5 were obtained based on a Tukey (a tapered cosine) window. That being said, there are a wide variety of taper types that might be used including, by way of example only, bell shaped, Hann, Hanning, triangle, etc. The range of taper parameters that are chosen may vary depending on the average distance between seismic recorders and distance of each trace to the shot location. Consider, for example, the data in FIG. 5, where the taper lengths for this example ranged in size between 30 and 150 samples, but the range certainly could have been chosen to be longer or shorter depending on the data. Those of ordinary skill in the art will be readily able to determine a suitable range of taper lengths given the geometry of the survey, the sample rate, etc.

Finally, the average of the minimum-phase equivalents of tapered near-field data with the selected size taper represents the estimated source signature. Because the reconstructed source signature is always minimum phase, it can be used directly for the source signature deconvolution without any hesitation regarding the inverse filter calculation. Although an average of the minimum-phase equivalents is a suitable way to obtain an estimate of the source signature, it should be noted that any measure of central value (e.g., median, geometric mean, etc.) could be used to obtain that estimate. Thus, for purposes of the instant disclosure when it is said that an estimated source signature is obtained from the minimum-phase equivalents of the tapered near-field data at the chosen taper length, that operation should be broadly construed as encompassing any method of obtaining a representative wavelet from a collection of estimates of same, whether produced by an average or some other operation.

An embodiment can be used to estimate both marine and land data's source signature regardless of the type of source. The flowchart of FIG. 3 summarizes an embodiment of the present inventive method for estimating the minimum-phase equivalent of source signature from direct waves at near-field data. Minimum-phase estimates of the source signature are desirable for many reasons, but one reason is that this estimate concentrates as much energy as possible toward the start of the wavelet, i.e., makes it as much like a spike as possible consistent with the measured data.

Turning first to box 31 of FIG. 3, the portion of the recorded seismic data where direct waves are the dominant signal is located in the closest offset traces of the shot-gather (FIG. 4). This part of the seismic signal is conventionally known as the first break and represents direct P-wave (pressure wave) arrivals, as opposed to reflected arrivals, from the source 11. In box 32, the near-field data are aligned (FIG. 5) based on their first-break arrival times (marked as 41 in FIG. 4). That is, in this example each seismic trace in FIG. 4 is shifted up an amount in time depending on its first break arrival time.

A preferred next step is to find a taper size that can isolate the source signature at the top of near-field data with minimum interaction with the Green's function. For this purpose, a range of taper sizes is selected, one function of which is to isolate the first-break energy from the rest of the wave train that follows. For each size of taper in the range, every near-field data trace is filtered (step 33), after which each filtered trace is converted to its minimum-phase equivalent (step 34). Methods of converting a wavelet to its minimum-phase equivalent are well known in the art and this step might be performed in any number of ways including via the methods of:

Herrmann and Schuessler (1970)

Kolmogoroff spectral factorization (Claerbout, 1976)

Method of Mian and Nainer (1982)

Stathaki and Fotinopoulos (2001)

Real cepstrum method (Pie and Lin, 2006)

Each method has its pros and cons; but the instant approach would potentially work well with any of them. For purposes of illustration only, Kolmogoroff spectral factorization (Claerbout, 1976) was used to calculate the minimum-phase equivalent in FIG. 6.

Next and according to the present embodiment, the pairwise cross-correlations (or other similarity values) of all of the calculated minimum phase wavelets at zero-lag are calculated (box 35). Note that the cross correlation operator actually produces a number that is representative of the similarity between two vectors, so any other similarity measure could potentially be used instead. If there are N traces, calculating all possible cross correlations will produce (N)*(N−1)/2 unique similarity values for each taper length. For purposes of the instant disclosure, when the phrase "calculating cross correlations from among the wavelets" or "calculating similarity values from among the wavelets" is used herein, that phrase should be interpreted to mean calculating the (N)*(N−1)/2 unique values described above.

As an alternative to cross-correlation, we can take the root-mean-square (RMS), in this case, for each taper length after tapering the aligned near-field data (step 33), convert them to their minimum-phase equivalents (step 34), and summing pairwise RMS of all of them (step 35) as an attribute that shows how much-tapered portions of the near-field data are look alike. The optimum taper size would then have a MINIMUM summation value (step 36). Finally, in step 37, the average of minimum-phase equivalents of tapered near-field data with the optimum size is the estimated source signature. The resulting cross-correlation values are then summed together, and the sum used as an attribute that indicates how closely the minimum phase tapered portions of the near-field data traces resemble each other. The preferred taper size will then be the one that has the highest summation value (step 36). Those of ordinary skill in the art will recognize that there are many other ways of determining the similarity between a collection of seismic traces and the example given here has only been selected for purposes of illustration, e.g., in some variations the N tapered traces associated with a taper length might be summed together and the power of the resulting sum (or average, median, etc.) computed, with the resulting power being an indication of similarity. Thus, for purposes of the instant disclosure the phrase "similarity calculation" will be used to represent a calculation that operates on the N near field, tapered, minimum phase waveforms to produce a numerical value that is representative of how similar the waveforms are to each other, with this similarity value being used to determine a preferred taper length.

Finally, in step 37, an estimated source signature will be obtained from the minimum-phase equivalents of the tapered near-field data associated with the taper length that has the highest similarity value. In some embodiments, the estimated source signature might be obtained by calculating an average of the associated minimum-phase wavelets, although other approaches might be used instead.

FIG. 6 provides a comparison of the minimum-phase equivalent wavelet of measured (FIG. 6*a*) and estimated (FIG. 6*b*) source signature using the present inventive method. It is important to note that the reconstructed source signature according to the instant method will be minimum-phase and can be used directly for the source signature deconvolution without concerns regarding the inverse filter calculation.

The estimated source signature has many uses and pursuant to the convolutional model it can be used to deconvolve the seismic traces in the gather to produce a clearer image of the subsurface. It also could be used to deconvolve traces from other gathers, although that might be most useful if the other gathers were acquired near to the gathers that were used to estimate the source signature. The source signature could also be used as an initial estimate for input into an inversion method as described previously. In brief, an accurate estimate of the source waveform results in better quality seismic images which are then associated with a lowered exploration risk.

It should be noted and understood that the invention is described herein with a certain degree of particularity. However, the invention is not limited to the embodiment(s) set forth herein for purposes of exemplification but is limited only by the scope of the attached claims.

It is to be understood that the terms "including", "comprising", "consisting" and grammatical variants thereof do not preclude the addition of one or more components, features, steps, or integers or groups thereof and that the terms are to be construed as specifying components, features, steps, or integers.

The singular shall include the plural and vice versa unless the context in which the term appears indicates otherwise.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

REFERENCES

Gholami, A., 2015. Nonlinear multichannel impedance inversion by total-variation regularization. GEOPHYSICS 80, R217—R224. https://doi.org/10.1190/geo2015-0004.1

Haghshenas Lari, H., Gholami, A., 2019. Nonstationary blind deconvolution of seismic records. Geophysics 84, V1-V9. https://doi.org/10.1190/geo2018-0225.1

Kazemi, N., 2018. Automatic blind deconvolution with Toeplitz-structured sparse total least squares. Geophysics 83, V345-V357. https://doi.org/10.1190/geo2018-0136.1

Kazemi, N., Sacchi, M.D., 2013. Sparse multichannel blind deconvolution. Geophysics 79, V143-V152 https://doi.org/10.1190/GEO2013-0465.1

Norris, Michael W., and Joseph M. Reilly. "Direct arrival signature estimates." U.S. Pat. No. 9,594,179. 14 Mar. 2017.

Kostov, Clement, et al. "Processing seismic data." U.S. patent application Ser. No. 13/259,546.

Guimarães, Marcos Antônio Gallotti. "Method for the measurement of multidirectional far-field source signatures from seismic surveys." U.S. Pat. No. 6,256,589. 3 Jul. 2001.

Lunde, Nils, Antoni Marjan Ziolkowski, and Gregory Ernest Parkes. "Combined impulsive and non-impulsive seismic sources." U.S. Pat. No. 8,427,901. 23 Apr. 2013.

Ni, Yuan. "Method and apparatus for estimating source signature in shallow water." U.S. Pat. No. 10,302,789. 28 May 2019.

Duren, Richard E., and Carol J. Zimmerman. "Method of generating seismic wavelets using seismic range equation." U.S. Pat. No. 5,173,880. 22 Dec. 1992.

Parkes, Gregory Ernest. "Method of seismic source monitoring using modeled source signatures with calibration functions." U.S. Pat. No. 7,218,572. 15 May 2007.

Tonchia, Hélène. "Seismic source array calibration and synchronization method, apparatus and system." U.S. Pat. No. 9,606,253. 28 Mar. 2017.

Hargreaves, Neil D. "Method for determining the far field signature of a marine seismic source from near-field measurements." U.S. Pat. No. 4,648,080. 3 Mar. 1987.

Nance, William Allen, and Keith Kunz. "Digital seismic source signature near-field hydrophone." U.S. patent application Ser. No. 15/094,485.

Kragh, Julian Edward, et al. "Zero-offset seismic trace construction." U.S. Pat. No. 8,958,266. 17 Feb. 2015.

Ziolkowski, A., 2017. Estimation of source time functions of explosions from seismograms, in: SEG Technical Program Expanded Abstracts 2017. Society of Exploration Geophysicists, pp. 106-110. https://doi.org/10.1190/segam2017-17677502.1

Ziolkowski, A., 1993. Determination of the signature of a dynamite source using source scaling, Part 1: Theory. GEOPHYSICS 58, 1174-1182. https://doi.org/10.1190/1.1443501

Ziolkowski, A., 1991. Why don't we measure seismic signatures? Geophysics 56, 190-201. https://doi.org/10.1190/1.1443031

Ziolkowski, A., Bokhorst, K., 1993. Determination of the signature of a dynamite source using source scaling, Part 2: Experiment. GEOPHYSICS 58, 1183-1194. https://doi.org/10.1190/1.1443502

Guillouet, Matthieu, Olivier Winter, and Thomas Bianchi. "Vibro seismic source separation and acquisition." U.S. Pat. No. 9,804,283. 31 Oct. 2017.

Bagaini, Claudio. "VIBROSEIS ACQUISITION METHOD." U.S. patent application Ser. No. 12/527,505.

Christie, Philip, and Zoë Lunnon. "Source signature deconvolution method." U.S. Pat. No. 7,551,515. 23 Jun. 2009.

Trantham, Eugene C. "Seismic vibrator signature deconvolution." U.S. Pat. No. 5,400,299. 21 Mar. 1995.

Claerbout, J. F., 1976. Fundamentals of geophysical data processing (Vol. 274). McGraw-Hill, New York.

Herrmann, O., and Schuessler, W., 1970, Design of nonrecursive digital filters with minimum phase: Electronics Letters, 6, No. 11, 329-330.

Mian, G. A., and Nainer, A., 1982, A fast procedure to design equiripple minimum-phase fir filters: Circuits and Systems, IEEE Transactions on, 29, No. 5, 327-331.

Pei, S.-C., and Lin, H.-S., 2006, Minimum-phase fir filter design using real cepstrum: Circuits and Systems II: Express Briefs, IEEE Transactions on, 53, No. 10, 1113-1117.

Stathaki, T., and Fotinopoulos, I., 2001, Equiripple minimum phase FIR filter design from linear phase systems using root moments: Circuits and Systems II: Analog and Digital Signal Processing, IEEE Transactions on, 48, No. 6,580-587.

What is claimed is:

1. A method of seismic data processing comprising the steps of:

(a) obtaining a source gather comprising a plurality of seismic traces, each of said traces being associated with a distance from a same seismic source, said source having a source signature associated therewith;

(b) using at least said associated distances to identify a plurality of near-field traces from within said source gather;

(c) determining a first break time associated with each of said plurality of near-field traces;

(d) using said determined first break times to align each of said plurality of near-field traces;

(e) selecting a taper;

(f) selecting a taper length;

(g) applying said taper and said selected taper length to each of said plurality of aligned near-field traces, thereby producing a same plurality of tapered aligned near-field traces;

(h) calculating a minimum-phase equivalent wavelet from each of said plurality of tapered aligned near-field wavelet estimates, thereby obtaining a plurality of minimum-phase equivalent wavelets;

(i) calculating a plurality of similarity values from among said plurality of minimum-phase equivalent wavelets;

(j) summing together said plurality of similarity values, thereby obtaining a quality value associated with the selected taper length;

(k) performing steps (f) through (j) for at least one other selected taper length, thereby obtaining a plurality of quality values, with each of said plurality of quality values being associated with one of said selected taper lengths;

(l) identifying a maximum value of said plurality of quality values and an identified taper length associated therewith;

(m) selecting said plurality of minimum-phase equivalent wavelets associated with said identified taper length;

(n) estimating said source signature using said selected plurality of minimum-phase equivalent wavelets; and (o) using said estimated source signature to process seismic data to obtain an improved subsurface image.

2. The method according to claim 1, wherein step (o) comprises the step of using said estimated source signature to deconvolve seismic data to obtain an improved subsurface image.

3. The method according to claim 1, wherein said selected taper is a tapered cosine.

4. The method according to claim 1, wherein said similarity value is a cross correlation value.

5. The method according to claim 1, wherein said selected taper length is between 30 and 150 samples.

6. The method according to claim 1, wherein the step of estimating said source signature using said selected plurality of minimum-phase equivalent wavelets comprises the step of estimating said source signature by calculating an average of said selected plurality of minimum-phase equivalent wavelets.

7. The method according to claim 1, wherein the step of using said determined first break times to align each of said plurality of near-field traces comprising the step of using said determined first break times to shift each of said plurality of near-field traces to a zero time, thereby aligning said plurality of near-field traces.

8. A method of seismic data processing comprising the steps of:

(a) obtaining a source gather comprising a plurality of seismic traces, each of said traces being associated with a distance from a same source, said source having a source signature;

(b) using at least said associated distances to identify a plurality of near-field traces from within said source gather;

(c) determining a first break time associated with each of said identified near-field traces, thereby obtaining a plurality of said first break times;

(d) using said plurality of first break times to align each of said near field traces;

(e) selecting a taper;

(f) selecting a taper length;

(g) using said selected taper and said selected taper length to filter each of said aligned near-field traces, thereby obtaining a plurality of wavelets;

(h) converting each of said plurality of wavelets to a minimum-phase equivalent wavelet;

(i) calculating a plurality of similarity values from among said plurality of minimum-phase equivalent wavelets;

(j) using said plurality of similarity values to obtain a quality value associated with said selected taper length;

(k) performing steps (f) through (j) for at least one other selected taper length, thereby obtaining a plurality of quality values, with each of said plurality of quality values being associated with one of said selected taper lengths;

(l) identifying a maximum value of said plurality of quality values and an identified taper length associated therewith;

(m) selecting said plurality of minimum-phase equivalent wavelets associated with said identified taper length;

(n) estimating said source signature using said selected plurality of minimum-phase equivalent wavelets; and (o) using said estimated source signature to process seismic data to obtain an improved subsurface image.

9. The method according to claim 8, wherein step (o) comprises the step of using said estimated source signature to deconvolve seismic data to obtain an improved subsurface image.

10. The method according to claim 8, wherein said selected taper is a tapered cosine.

11. The method according to claim 8, wherein said similarity value is a cross correlation value.

12. The method according to claim 8, wherein said selected taper length is between 30 and 150 samples.

13. The method according to claim 8, wherein the step of estimating said source signature using said selected plurality of minimum-phase equivalent wavelets comprises the step of estimating said source signature by calculating an average of said selected plurality of min-mum-phase equivalent wavelets.

14. The method according to claim 8, wherein the step of using said determined first break times to align each of said plurality of near-field traces comprising the step of using said determined first break times to shift each of said plurality of near-field traces to a zero time, thereby aligning said plurality of near-field traces.

15. The method according to claim 8, wherein the step of using said plurality of similarity values to obtain a quality value associated with said selected taper length comprises the step of summing together said plurality of similarity values, thereby obtaining a quality value associated with said selected taper length.

16. A computerized method of estimating a seismic source using software executing in a computer, said software performing at least the steps of:

(a) accessing a source gather comprising a plurality of seismic traces, each of said traces being associated with a distance from said same seismic source, said source having a source signature associated therewith;

(b) using at least said associated distances to identify a plurality of near-field traces from within said source gather;

(c) determining a first break time associated with each of said plurality of near-field traces;

(d) using said determined first break times to align each of said plurality of near-field traces;

(e) selecting a taper;

(f) selecting a taper length;

(g) applying said taper and said selected taper length to each of said plurality of aligned near-field traces, thereby producing a same plurality of tapered aligned near-field traces;

(h) calculating a minimum-phase equivalent wavelet from each of said plurality of tapered aligned near-field wavelet estimates, thereby obtaining a plurality of minimum-phase equivalent wavelets;

(i) calculating a plurality of similarity values from among said plurality of minimum-phase equivalent wavelets;

(j) summing together said plurality of similarity values, thereby obtaining a quality value associated with the selected taper length;

(k) performing steps (f) through (j) for at least one other selected taper length, thereby obtaining a plurality of quality values, with each of said plurality of quality values being associated with one of said selected taper lengths;

(l) identifying a maximum value of said plurality of quality values and an identified taper length associated therewith;

(m) selecting said plurality of minimum-phase equivalent wavelets associated with said identified taper length;

(n) estimating said source signature using said selected plurality of minimum-phase equivalent wavelets; and (o) using said estimated source signature to process seismic data to obtain an improved subsurface image.

* * * * *